United States Patent
Huang et al.

(10) Patent No.: US 12,511,043 B2
(45) Date of Patent: Dec. 30, 2025

(54) GPU MEMORY COPY ON WRITE STRATEGY FOR CLOUD GAMING AND COMPUTING

(71) Applicants: Advanced Micro Devices, Inc., Santa Clara, CA (US); ATI Technologies ULC, Markham (CA)

(72) Inventors: AnZhong Huang, Shanghai (CN); ZhengSan Jian, Shanghai (CN); Weilie Zhao, Markham (CA); Owen Zhang, Toronto (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 97 days.

(21) Appl. No.: 18/620,091

(22) Filed: Mar. 28, 2024

(65) Prior Publication Data
US 2025/0306758 A1     Oct. 2, 2025

(51) Int. Cl.
*G06F 3/06*     (2006.01)
*A63F 13/355*     (2014.01)
*A63F 13/77*     (2014.01)

(52) U.S. Cl.
CPC .......... *G06F 3/0608* (2013.01); *A63F 13/355* (2014.09); *A63F 13/77* (2014.09); *G06F 3/0659* (2013.01); *G06F 3/0673* (2013.01)

(58) Field of Classification Search
CPC .... G06F 3/0608; G06F 3/0659; G06F 3/0673; A63F 13/355; A63F 13/77
See application file for complete search history.

(56) References Cited

U.S. PATENT DOCUMENTS

| | | | |
|---|---|---|---|
| 6,789,156 B1 * | 9/2004 | Waldspurger | G06F 12/1018 718/1 |
| 2021/0034319 A1 * | 2/2021 | Wang | H04N 13/275 |
| 2024/0045804 A1 * | 2/2024 | Wang | G06F 12/023 |

* cited by examiner

*Primary Examiner* — Jason W Blust
(74) *Attorney, Agent, or Firm* — Kowert, Hood, Munyon, Rankin & Goetzel, P.C.; Rory D. Rankin (57) ABSTRACT

An apparatus and method for performing efficient sharing of network-based resources. In various implementations, a computing system includes a remote server providing a streaming service to a client computing device over a network. The remote servers include shared resources that provide services and content on the client computing device. When executing instructions of a shared layer of a graphics library, the circuitry of a parallel data processing circuit of the remote server searches for any instances sharing the image object. If there are any instances sharing the image object, then the circuitry maintains the image object stored in a first location of the local shared memory. The circuitry performs a copy on write operation using a local non-shared memory to generate the copy of the first image object in a second location different from the first location of the local shared memory.

20 Claims, 7 Drawing Sheets

GPU MEMORY COPY ON WRITE STRATEGY FOR CLOUD GAMING AND COMPUTING

BACKGROUND

Description of the Relevant Art

Streaming services have become commonplace and include services that allow a user to access in real-time through a network a variety of content provided on remote servers. The network can be a cloud network that includes a wide area network (WAN) for supporting communication between multiple client devices and multiple remote servers where the remote servers provide authorized access to a variety of resources and services. The remote servers are cloud-based servers. The content is presented in a virtual computing environment on the user's computing device such as a laptop computer, desktop computer, smartphone, or other. Video game (or gaming) streaming services is an example of services providing real-time presentation of content on a user's computing device where the content is updated in real-time based on user input.

The remote servers include shared resources that provide the services and content on the user's computing device. Examples of the shared resources are one or more advanced processing circuits to satisfy the high computation demands of providing the services and content, and dedicated memory for the one or more processing circuits. Each user accessing a streaming service on a cloud-based server generates a process on the cloud-based server. As the number of users generating processes on the cloud-based server increases, the contention increases for the shared resources.

In view of the above, efficient methods and apparatuses for performing efficient sharing of network-based resources are desired.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods for performing efficient sharing of network-based resources are contemplated. In various implementations, a computing system includes a remote server providing a streaming service to a client computing device (or client device) over a network. The network can be a cloud network that includes a wide area network (WAN) for supporting communication between multiple client devices and multiple remote servers where the remote servers provide authorized access to a variety of resources and services. The remote servers are cloud-based servers. Examples of the client device are a laptop computer, a desktop computer, a smartphone, or other. The content is presented in a virtual computing environment on the user's computing. Video game (or gaming) streaming services is an example of services providing real-time presentation of content on a user's computing device where the content is updated in real-time based on user input.

The remote servers include shared resources that provide the services and content on the user's computing device. Examples of the shared resources are one or more advanced processing circuits providing the services and content, and dedicated memory for the one or more processing circuits. In some implementations, the remote server includes circuitry of an accelerated processing unit (APU) that includes multiple different integrated circuits, each providing different functionality. For example, the APU includes at least a general-purpose processing unit, such as a central processing unit (CPU), with multiple cores capable of executing instructions of a general-purpose instruction set architecture (ISA). The APU also includes a parallel data processing unit, such as a graphics processing unit (GPU), that includes the circuitry of one or more processor cores with a single instruction multiple data (SIMD) parallel architecture. The parallel data processing circuit can also include a digital signal processing circuit (DSP), a field programmable gate array (FPGA), an application specific integrated circuit (ASIC), and so forth. The general-purpose processing circuit translates instructions of parallel data function calls of an application to commands that are executable by the parallel data processing circuit.

Each user accessing a streaming service on a cloud-based server generates an application process (or process) on the cloud-based server. When a software application, such as a video game application used by the streaming service, is compiled, the application includes multiple "application processes", or simply "processes." Each of the multiple processes includes its own resources. Each of these processes corresponding to a separate user and having its own resources is an instance. Examples of the resources are an address space that addresses the code (instructions and/or translated commands), source data, and possibly a heap and a stack; variables in data and control registers such as stack pointers, general and floating-point scalar registers and vector registers, a program counter value; and operating system descriptors such as stdin, stdout, and otherwise, and security attributes such as process owner and the process' set of permissions. As used herein, an "instance" is also referred to as an "application process," a "process" and a "game instance."

When executing instructions of a shared layer of a graphics library, the circuitry of a parallel data processing circuit intercepts a copy request (or copy command) from an instance to create a copy of an image object stored in a local shared memory. An image object is data used to provide a three-dimensional (3-D or 3D) representation of an object presented on a user's display device during execution of the video game application. Examples of the image object are a car used in a video game, a video game avatar or character, a tree used as scenery in the video game, and so forth. The image object is stationary prior to any 3D animation steps being performed. When executing instructions of a shared layer of a graphics library, the circuitry of the parallel data processing circuit searches for any instances sharing the image object. If there are no instances sharing the image object, then the circuitry performs a write operation to generate the copy of the image object in the local shared memory. If there are any instances sharing the image object, then the circuitry maintains the image object stored in a first location of the local shared memory. The circuitry performs a copy on write operation using a local non-shared memory to generate the copy of the first image object in a second location different from the first location of the local shared memory. Further details of these techniques to perform efficient sharing of network-based resources are provided in the following description of FIGS. 1-7.

Figure 1:
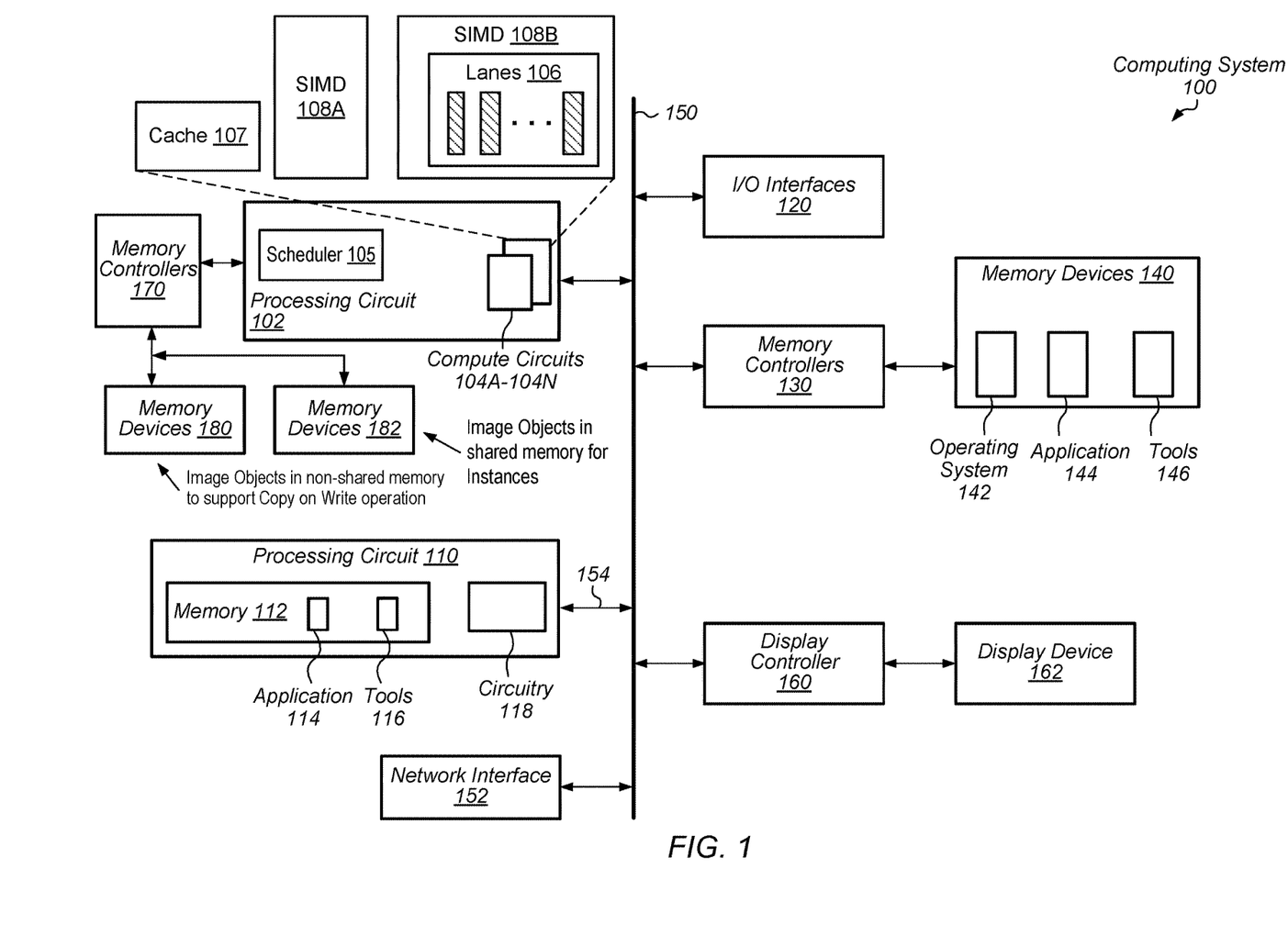
FIG. 1 is a generalized diagram of a computing system that performs efficient sharing of network-based resources.

Turning now to FIG. 1, a generalized diagram is shown of a computing system 100 that performs efficient sharing of network-based resources. In an implementation, the computing system 100 includes at least processing circuits 102 and 110, input/output (I/O) interfaces 120, bus 150, network interface 152, memory controllers 130 for communicating with memory devices 140, memory controllers 170 for communicating with memory devices 180 and memory devices 182, display controller 160 for communicating with display device 162. In other implementations, computing system 100 includes other components and/or computing system 100 is arranged differently. For example, power management circuitry, and phased locked loops (PLLs) or other clock generating circuitry are not shown for ease of illustration. In various implementations, the components of the computing system 100 are on the same die such as a system-on-a-chip (SOC). In other implementations, the components are individual dies in a system-in-package (SiP) or a multi-chip module (MCM).

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth.

Processing circuits 102 and 110 are representative of any number of processing circuits which are included in computing system 100. In an implementation, processing circuit 110 is a general-purpose central processing unit (CPU). In one implementation, processing circuit 102 is a parallel data processing circuit with a highly parallel data microarchitecture, such as a GPU. The processing circuit 102 can be a discrete device, such as a dedicated GPU (dGPU), or the processing circuit 102 can be integrated (an iGPU) in the same package as another processing circuit. Other parallel data processing circuits that can be included in computing system 100 include digital signal processing circuits (DSPs), field programmable gate arrays (FPGAs), application specific integrated circuits (ASICs), and so forth.

In various implementations, processing circuit 102 includes multiple, replicated compute circuits 104A-104N, each including similar circuitry and components such as the SIMD circuits 108A-108B, the cache 107, and other hardware resources (not shown). The SIMD circuit 108A includes replicated circuitry of the circuitry of the SIMD circuit 108A. Although two SIMD circuits are shown, in other implementations, another number of SIMD circuits is used based on design requirements. As shown, the SIMD circuit 108B includes multiple, parallel computational lanes 106. Cache 107 can be used as a shared last-level cache in a compute circuit of compute circuits 104A-104N.

Network interface 152 includes circuitry for supporting incoming and outgoing messages and data between computing system 100 and a network. Network interface 152 receives and sends network messages across a network. The network can be a cloud network that includes a wide area network (WAN) for supporting communication between multiple client devices and multiple remote servers where the remote servers provide authorized access to a variety of resources and services. The remote servers are cloud-based servers. In some implementations, computing system 100 utilizes a communication fabric ("fabric"), rather than the bus 150, for transferring requests, responses, and messages between the processing circuits 102 and 110, the I/O interfaces 120, the memory controllers 130, the network interface 152, and the display controller 160. When messages include requests for obtaining targeted data, the circuitry of interfaces within the components of computing system 100 translates target addresses of requested data. In some implementations, the bus 150, or a fabric, includes circuitry for supporting communication, data transmission, network protocols, address formats, interface signals and synchronous/asynchronous clock domain usage for routing data.

Memory 112 of processing circuit 110 represents a local hierarchical cache memory subsystem. Memory 112 stores source data, intermediate results data, results data, and copies of data and instructions stored in memory devices 140. Processing circuit 110 is coupled to bus 150 via interface 154. Processing circuit 110 receives, via interface 154, copies of various data and instructions, such as the operating system 142, one or more device drivers, one or more applications such as application 144, tools 146, and/or other data and instructions. Memory controllers 130 are representative of any number and type of memory controllers accessible by processing circuits 102 and 110. Memory controllers 130 include queues for storing memory access requests, memory write data, memory read responses, and memory snoop responses. Memory controllers 130 include also include arbitration circuitry and other circuitry to support a communication protocol with memory devices 140.

While memory controllers 130 are shown as being separate from processing circuits 102 and 110, it should be understood that this merely represents one possible implementation. In other implementations, one of memory controllers 130 is embedded within one or more of processing circuits 102 and 110 or it is located on the same semiconductor die as one or more of processing circuits 102 and 110. Memory controllers 130 are coupled to any number and type of memory devices 140. Memory controllers 170 are representative of any number and type of memory controllers accessible by processing circuit 102. Memory controllers 170 include circuitry described earlier for memory controllers 130.

In an implementation, memory controllers 170 supports one of a variety of types of a Graphics Double Data Rate (GDDR) communication protocol to transfer data with memory devices 180 and 182 via a corresponding communication channel. In various implementations, the communication channels used by memory controllers 170 and memory devices 180 and 182 are point-to-point communication channels. A point-to-point communication channel is a dedicated communication channel between a single source and a single destination. Therefore, the point-to-point communication channel transfers data only between the single source and the single destination. It is also possible and contemplated that computing system 100 implements local non-shared memory as a dedicated subregion or partition of memory devices 182 (local shared memory) and does not utilize memory devices 180.

Memory devices 140, 180 and 182 are representative of any number and type of memory devices. For example, the type of memory in memory devices 140 includes Dynamic Random Access Memory (DRAM), Static Random Access Memory (SRAM), NAND Flash memory, NOR flash memory, Ferroelectric Random Access Memory (FeRAM), or otherwise. Memory devices 140 store at least instructions of an operating system 142, one or more device drivers, application 144 and tools 146. The processing circuit 110 retrieves a copy of the application 144 from the memory devices 140, and the processing circuit 110 stores this copy as application 114 in memory 112. In some implementations, application 144 is a highly parallel data application such as a video game application used for video game (or gaming) streaming services. Copies of these instructions can be stored in a memory or cache device local to processing circuit 110 and/or processing circuit 102.

A particular combination of the same instruction and a particular data item of multiple data items is referred to as a "work item." A work item is also referred to as a thread. The multiple work items (or multiple threads) are grouped into thread groups, where a "thread group" is a partition of work executed in an atomic manner. In some implementations, a thread group includes instructions of a function call that operates on multiple data items concurrently. Each data item is processed independently of other data items, but the same sequence of operations of the subroutine is used. As used herein, a "thread group" is also referred to as a "work block" or a "wavefront." Tasks performed by compute circuits 104A-104N can be grouped into a "workgroup" that includes multiple thread groups (or multiple wavefronts).

The hardware, such as circuitry, of scheduler 105 of processing circuit 102 divides the workgroup into separate thread groups (or separate wavefronts) and assigns the wavefronts to be dispatched to the compute circuits 104A-104N. In an implementation, scheduler 105 is a command processing circuit of a GPU. In some implementations, the application 144 stored on the memory devices 140 and its copy (application 114) stored on the memory 112 are a highly parallel data application that includes particular function calls using an API to allow the developer to dispatch wavefronts of a kernel (function call) of a highly parallel data application. In an implementation, the function call is a C++ object, and it is converted by circuitry 118 of the processing circuit 110 to a command.

In some implementations, application 144 is a highly parallel data application that provides multiple kernels to be executed on compute circuits 104A-104N. The high parallelism offered by the hardware of the compute circuits 104A-104N is used for real-time data processing. Examples of real-time data processing are rendering multiple pixels, image blending, pixel shading, vertex shading, and geometry shading. In such cases, each of the data items of a wavefront is a pixel of an image. Compute circuits 104A-104N can also be used to execute other threads that require operating simultaneously with a relatively high number of different data elements (or data items). Examples of these threads are threads for scientific, medical, finance and encryption/decryption computations.

A variety of computing devices use the computing system 100. In various implementations, a remote server, such as a cloud-based server, utilizes computing system 100 to provide a streaming service to multiple client computing devices (or client devices) over a network such as the cloud. The remote server includes resources shared by the multiple client devices that provide the services and content on the client device. Examples of the shared resources are one or more of the processing circuits 102 and 110, and dedicated memory such as memory devices 182 being dedicated and local for processing circuit 102. In some implementations, memory devices 182 provides dedicated video memory for processing circuit 102.

Video game (or gaming) streaming services is an example of services providing real-time presentation of content on a user's computing device where the content is updated in real-time based on user input. Each user of a computing device accessing a streaming service on a cloud-based server that utilizes computing system 100 generates a process on the cloud-based server. When a software application, such as application 114, is compiled, the application includes multiple "application processes", or simply "processes." Each of the multiple processes includes its own resources such as an image of memory, or an instance of instructions (or translated commands) and data before application execution. Also, each process includes process-specific information such as an address space that addresses the code (instructions and/or translated commands), source data, and possibly a heap and a stack; variables in data and control registers such as stack pointers, general and floating-point scalar registers and vector registers, a program counter value; and operating system descriptors such as stdin, stdout, and otherwise, and security attributes such as process owner and the process' set of permissions.

A new instance initiates when a client device of a user successfully connects through the cloud and network interface 152 to a video game application, such as application 114, on the remote server utilizing computing system 100. As used herein, an "instance" is also referred to as a "process" and a "game instance." Each instance is an application process, or simply process. This instance is maintained and updated until the client device of the user logs off or otherwise exits the video game application through the cloud and network interface 152. When a user transitions from one level of the video game to another level and when a processing circuit of processing circuits 102 and 110 executes instructions and commands of application 114, the processing circuit polls the instance of the user to retrieve a currently used value for the user's score. The processing circuit updates a player state with the retrieved score and updates the player state as the user plays at the current level of the video game application 114. When the user completes the level, the processing circuit updates the score of the instance with the most-recent score of the player state.

In addition to the player score, when the processing circuit (processing circuit 102 or 110) executing the application 114 transitions the user from one level of the video game to the next level, one or more other parameters of the instance can be updated. For example, in some implementations, one or more image objects change shape, color, texture, size and so forth. An image object is data used to provide a three-dimensional (3-D or 3D) representation of an object presented on a user's display device during execution of the video game application. Examples of the image object are a car used in a video game, a video game avatar or character, a tree used as scenery in the video game, and so forth. Memory devices 182 can be used as video memory of processing circuit 102 and store shared resources such as shared image objects and corresponding characteristics such as at least textures. In an implementation, hundreds of users are connected to the executing application 114, thus creating hundreds of individual instances. Many of these instances share a particular image object stored in memory devices 182.

In various implementations, memory controllers 170 maintain a table or other data structure that tracks information corresponding to the image objects stored in memory devices 182. For a particular image object stored in memory devices 182, memory controllers 170 maintain a code value of a corresponding image object stored in the local shared memory. In an implementation, the code value is a hash value based on the content of the corresponding image object. Memory controllers 170 also maintain a count, which is the number of instances accessing (and thus, sharing) the corresponding image object. The term "count" can also be referred to as the "reference count." When executing instructions of tools 116 by processing circuit 102, processing circuit 102 accesses an image object stored in memory devices 182 and the image object is a dog used in a video game application. In some implementations, when the image object (dog) already exists in memory devices 182 (local shared memory), other instances can access (and thus, share) the image object (dog). When another instance accesses the image object (dog), processing circuit 102 or memory controllers 170 provides location information to this instance. The location information points to a data storage location of the memory devices 182 (local shared memory) that stores a copy of the image object (dog). The location information can include an address, a file descriptor, a reference handle, or another type of location information. Processing circuit 102 or memory controllers 170 updates the reference count for the image object (dog). For example, processing circuit 102 or memory controllers 170 increments the reference count for the image object (dog), if this instance has not yet accessed the image object (dog).

Sharing an image object stored in memory devices 182 alleviates capacity restraints on memory devices 182, whereas providing a separate image object to each of the hundreds of instances would quickly consume the data storage space of memory devices 182. However, when an instance of a user transitions to another level of the video game application, it is possible that a shared image object is updated. It is possible that this update does not apply to other instances of other users sharing the same image object. In an example, a first instance and a second instance share an image object representing a car. The user corresponding to the first instance transitions to another level of the video game application (application 114) prior to the user of the second instance. In an implementation, the first instance has the image object updated from a car to a dog. Processing circuit 102 executing the translated command of instructions of a function call of the video game application (application 114) performs the update.

In an implementation, processing circuit 102 executes a function call with a copy command implemented as an application programming interface (API). Application 114 is written by a developer using a high-level language (e.g., C, C++, FORTRAN, and Java) that utilizes graphic libraries with their own APIs. Copy commands are function calls that use an API that provides a function call from a graphics library to generate a copy of an image object. As used herein, a "copy command" can also be referred to as a "copy request" or a "copy API." In some cases, the copy command modifies the original image object. In other cases, the copy command creates a copy of the image object in another region of data storage space of memory devices 182 (local shared memory). When the first instance executes a copy command to update the image object from a car to a dog, data corruption can occur, since the second instance is still using the image object as a car. If processing circuit 102 overwrites the image object (car) with the copy of the image object corresponding to the copy command (dog), then data corruption occurs for the second instance. To avoid corruption such as this example, when executing instructions of tools 116 by processing circuit 102, processing circuit 102 performs a copy on write operation to update the image object for the first instance from a car to a dog while maintaining the original image object of the car for the second instance.

To perform the copy on write operation, when executing instructions of tools 116, processing circuit 102 writes (stores) the copy of the updated content of the copy of the image object (the dog) in memory devices 180. In some implementations, memory devices 180 are used as local non-shared memory by processing circuit 102, whereas memory devices 182 are used as both video memory and local shared memory by processing circuit 102. When executing instructions of tools 116, processing circuit 102 searches the memory devices 182 (local shared memory) for the content of the original image object (car) and the content of the copy of the image object (dog). When processing circuit 102 determines the content of the original image object (car) is shared by at least the first instance and the second instance, processing circuit 102 allocates data storage space of the memory devices 182 (local shared memory).

Afterward, processing circuit 102 writes the copy of the image object (dog) from the memory devices 180 (local non-shared memory) to the allocated data storage space of the memory devices 182 (local shared memory). Processing circuit 102 provides, to the first instance, location information of the allocated data storage space of the memory devices 182 (local shared memory) storing the copy of the image object (dog). The second instance continues to use different location information of the allocated data storage space of the memory devices 182 (local shared memory) storing the image object (car).

In some implementations, processing circuit 102 removes the copy of the image object (dog) from memory devices 180 (local non-shared memory) upon updating the data storage space of the memory devices 182 (local shared memory) with the copy of the image object (dog). In other implementations, processing circuit 102 removes the copy of the image object (dog) from memory devices 180 (local non-shared memory) at a later time such as when the capacity of memory devices 180 (local non-shared memory) exceeds a threshold. In some implementations, when executing instructions of tools 116 and determining an image object (car) is not shared by multiple instances, processing circuit 102 overwrites the image object (car) stored in memory devices 182 (local shared memory) with the copy of the image object (dog). In yet other implementations, when an image object (car) is not shared by multiple instances, processing circuit 102 maintains the image object (car) and allocates another data storage location for the copy of the image object (dog) when the allocated capacity of memory devices 182 (local shared memory) is below a threshold.

To perform the search of the memory devices 182 (local shared memory) for the content of the original image object (car) and the content of the copy of the image object (dog), when executing the instructions of tools 116, processing circuit 102 sends a request to a processing circuit 110 to generate a code based on the content of the original image object (car) and another code based on the content of the copy of the image object (dog). As described earlier, in an implementation, each of these codes is a hash value based on the varying data sizes of the content of a corresponding one of the original image object (car) and the copy of the image object (dog). Processing circuit 110 uses a hash function that follows a particular algorithm to generate the hash value as a numeric value of a fixed length that uniquely identifies data such as a particular image object.

Processing circuit 110 returns the codes to processing circuit 102. In some implementations, processing circuit 102 and processing circuit 110 utilize a communication channel (not shown) between them to transfer data and communicate with one another. Each of processing circuit 102 and processing circuit 110 includes an input/output (I/O) interface to support data transmission on the communication channel. In various implementations, the communication channel provides a point-to-point (P2P) interconnection. In an implementation, processing circuit 102 and processing circuit 110 support a communication protocol such as the Peripheral Component Interconnect Express (PCIe) protocol. When executing the instructions of tools 116, processing circuit 102 searches a data structure, such as a table, using the returned hash codes. As described earlier, in some implementations, memory controllers 170 maintain this data structure. In other implementations, processing circuit 102 maintains this data structure. The data structure allows processing circuit 102 to determine whether the corresponding image object is stored in memory devices 182 (local shared memory) and how many instances share the corresponding image object. For example, the data structure stores a count (a reference count) that specifies a number of instances that have accessed the corresponding image object stored in memory devices 182 (local shared memory).

As described earlier, application 114 is written by a developer using a high-level language (e.g., C, C++, FORTRAN, and Java) that utilizes graphic libraries that include their own APIs. One of a variety of development environments providing a platform for an interface to graphics libraries for programming and rendering video games and other real-time three-dimensional (3D or 3-D) graphics applications can be used. Examples of these platforms are Vulkan, OpenGL (Open Graphics Library), OpenGL for Embedded Systems (OpenGL ES), DirectX, and so forth. Tools 116 includes a platform loader, one or more platform device drivers, and one or more intermediate platform layers between the platform loader and the one or more platform device drivers. The one or more intermediate platform layers includes a sharing layer that intercepts copy function calls executed by application 114 and performs the above steps to avoid data corruption in memory devices 182 (local shared memory). Further details of the components of tools 116 are provided in the description of apparatus 300 (of FIG. 3).

Figure 2:
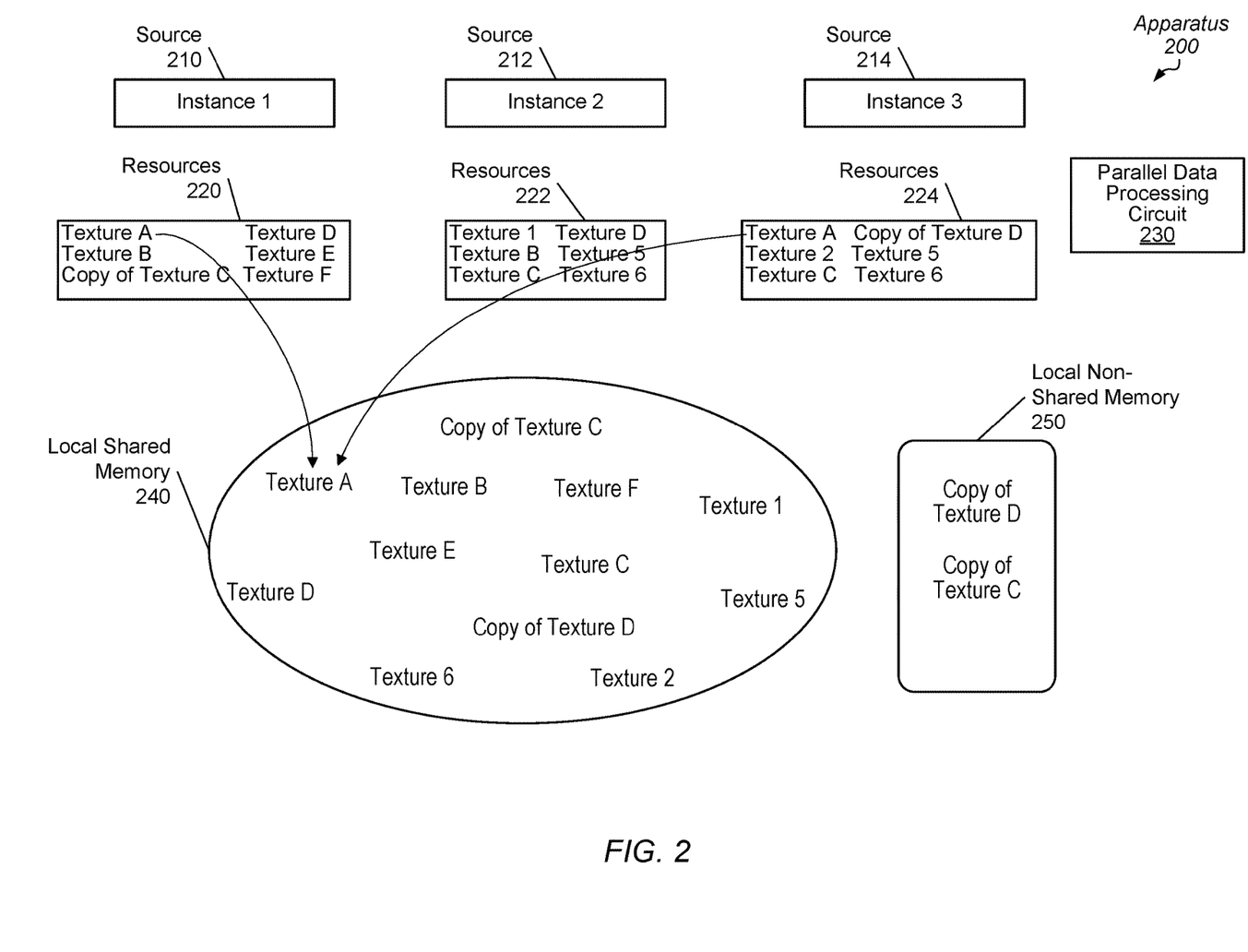
FIG. 2 is a generalized diagram of an apparatus that performs efficient sharing of network-based resources.

Referring to FIG. 2, a generalized diagram is shown of an apparatus 200 that performs efficient sharing of network-based resources. In the illustrated implementation, apparatus 200 includes sources 210-214, multiple shared network-based resources (or resources) 220-224, a parallel data processing circuit 230, local shared memory 240, and local non-shared memory 250. In some implementations, the parallel data processing circuit 230 is a graphics processing unit (GPU), that includes the circuitry of one or more processor cores with a single instruction multiple data (SIMD) parallel architecture. Other examples of parallel data processing circuit 230 are a digital signal processing circuit (DSP), a field programmable gate array (FPGA), an application specific integrated circuit (ASIC), and so forth. In an implementation, the parallel data processing circuit 230 is one processing unit of an accelerated processing unit (APU) that includes multiple different integrated circuits (not shown), each providing different functionality. For example, the APU includes at least a general-purpose processing unit, such as a central processing unit (CPU), with multiple cores capable of executing instructions of a general-purpose instruction set architecture (ISA). In other implementations, parallel data processing circuit 230 is a discrete processing circuit on a separate card inserted or soldered on a motherboard. The general-purpose processing circuit translates instructions of parallel data function calls of an application to commands that are executable by the parallel data processing circuit 230.

The local shared memory 240 has the functionality of memory devices 182 (of FIG. 1) and local non-shared memory 250 has the functionality of memory devices 180 (of FIG. 1). In various implementations, a remote server includes apparatus 200. The remote server provides a streaming service to a client computing device (or client device) over a network. The network can be a cloud network that includes a wide area network (WAN) for supporting communication between multiple client devices and multiple remote servers where the remote servers provide authorized access to a variety of resources and services. The remote servers are cloud-based servers. Examples of the client device are a user's computing device such as a laptop computer, a desktop computer, a smartphone, or other. The content can be presented in a virtual computing environment on the user's computing. Video game (or gaming) streaming services is an example of services providing real-time presentation of content on a user's computing device where the content is updated in real-time based on user input.

Each user accessing a streaming service on a cloud-based server generates a process on the cloud-based server. Each of the instances 210, 212 and 214 is a separate process generated by circuitry of the general-purpose processing circuit executing instructions of an operating system of the cloud-based server. Each of the instances 210, 212 and 214 includes context information such as a unique identifier, a network address of a corresponding client device, a set of permissions for the client device, location information of image objects for the instance, player statistics such as a score and an indication of a game level, and so on. Each of the instances 210, 212 and 214 also includes instructions of a parallel data application, such as a video game application, a platform loader, one or more layers, and one or more device drivers. Further details of these components are provided in the description of apparatus 300 (of FIG. 3).

The image objects used by instances 210, 212 and 214 include texture information such as Texture A to Texture F, Texture 5, and Texture 6 stored in local shared memory 240. A three-dimensional (3D or 3-D) image object, such a car or a video game avatar or character or a tree used as scenery, is subdivided into multiple two-dimensional (2D) geometric shapes such as triangles. Each of these multiple triangles is rotated at different angles in the 3D space of the image object. The 3D image object uses x, y, and z (or "X," "Y," and "Z") coordinates of a 3D space, whereas the 2D triangles use u and v (or "U" and "V") coordinates of a 2D space such as a UV texture space. When executing the instructions of a video processing application, parallel data processing circuit 230 performs the steps of UV mapping, which includes generating a flat 2D representation of a 3D object with volume (or depth) and shape. In an example, the 3D face of a video game character with volume and multiple shapes is generated or projected on a flat 2D space.

After UV mapping, parallel data processing circuit 230 applies texture to the multiple triangles used to characterize and create the 3D image object. A texture map includes data that specifies color, surface texture (rough, smooth, dented, reflective), and small repeating details (multiple scratches, multiple ridges). Texture mapping includes the steps of applying these traits to the surface of the multiple 2D triangles, which are rotated at different angles in the 3D space of the image object. Although textures are shown being stored in local shared memory 240, it is possible and contemplated that parallel data processing circuit 230 uses 3D image objects as the granularity of shared network-based resources.

As shown, Instance 1 (source 210) currently uses resources 220, Instance 2 (source 212) currently uses resources 222, and Instance 3 (source 214) currently uses resources 224. Resources 220 includes Texture A, Texture B, a copy of Texture C, and Textures D, E and F. Instance 3 (source 214) also uses Texture A. However, only a single copy of Texture A is stored in local shared memory 240, which alleviates the data storage restraints on local shared memory 240. In various implementations, apparatus 200 uses multiple data structures, such as tables, that track information corresponding to the textures stored in local shared memory 240. Examples of the information are a hash value based on the content of a corresponding texture, location information that includes one or more values that point to a data storage location of the local shared memory 240 that stores a copy of the corresponding texture, and a reference count specifying the number of instances accessing (and thus, sharing) the corresponding texture.

Each of Instance 1 (source 210) and Instance 3 (source 214) uses the same location information to point to the allocated data storage space of local shared memory 240 that stores the content of Texture A. In some implementations, the location information is a series of pointers used to identify the allocated data storage space of local shared memory 240 that stores the content of Texture A. In an implementation, apparatus 200 uses multiple data structures, such as tables, indexed by an assigned positive integer used to identify the next data structure to search with the next pointer in the series of pointers. In some implementations, the location information includes a file descriptor.

At an earlier point in time, each of Instance 1 (source 210) and Instance 3 (source 214) uses the same location information to point to the allocated data storage space of local shared memory 240 that stores the content of Texture C. However, the user of Instance 1 moved onto another level of the video game application, and Instance 1 sends a copy command (e.g., function call CopyImage( )) to update (modify) Texture C. In an example, Texture C provides details of a glossy red, smooth exterior of a new car. However, at the next game level, Instance 1 attempts to update (modify) Texture C to provide details of a spotted, shaggy dog. If parallel data processing circuit 230 overwrites Texture C, which is associated with the exterior of the car as the 3D image object, with the Copy of Texture C, which is associated with the coat of the dog as the 3D image object, then data corruption occurs.

To avoid data corruption, when executing instructions of tools, such as development layers in Instance 1, parallel data processing circuit 230 performs a copy on write operation to update Texture C for Instance 1 while maintaining the original Texture C for Instance 3. To perform the copy on write operation, when executing instructions of tools of Instance 1, parallel data processing circuit 230 writes (stores) the Copy of Texture C in local non-shared memory 250. Parallel data processing circuit 230 searches local shared memory 240 for the content of Texture C (exterior of car) and the content of the Copy of Texture C (coat of dog). When parallel data processing circuit 230 determines the content of Texture C (exterior of car) is shared by at least Instance 1 and Instance 3 and Copy of Texture C (coat of dog) is not stored in local shared memory 240, parallel data processing circuit 230 allocates data storage space of the local shared memory 240. Afterward, parallel data processing circuit 230 writes the Copy of Texture C (coat of dog) from the local non-shared memory 250 to the allocated data storage space of local shared memory 240. Parallel data processing circuit 230 provides, to Instance 1, location information of the allocated data storage space of local shared memory 240 storing the Copy of Texture C (coat of dog). Instance 3 continues to use location information of the allocated data storage space of local shared memory 240 storing Texture C (exterior of car).

However, when parallel data processing circuit 230 determines the content of Texture C (exterior of car) is shared by at least Instance 1 and Instance 3 and Copy of Texture C (coat of dog) is stored in local shared memory 240, parallel data processing circuit 230 does not allocate data storage space of the local shared memory 240. For example, Texture F has the same hash value as Copy of Texture C (coat of dog). Parallel data processing circuit 230 increments the reference count of Texture F and sends the location information of Texture F to Instance 1. Instance 3 continues to use location information of the allocated data storage space of local shared memory 240 storing Texture C (exterior of car) and Instance 1 now uses location information of the allocated data storage space of local shared memory 240 storing Texture F, which is an already existing copy of Copy of Texture C (coat of dog).

In some implementations, parallel data processing circuit 230 removes the Copy of Texture C (coat of dog) from the local non-shared memory 250 upon updating the data storage space of the local shared memory 240 with the Copy of Texture C (coat of dog). In other implementations, parallel data processing circuit 230 removes the Copy of Texture C (coat of dog) from the local non-shared memory 250 at a later time such as when capacity of the local non-shared memory 250 exceeds a threshold. In some implementations, when executing instructions of tools in Instance 1 and determining a Texture (e.g., Texture 2) is not shared by multiple instances, parallel data processing circuit 230 overwrites the Texture stored in the local shared memory 240 with the Copy of Texture when that texture is being updated. In yet other implementations, when the Texture (e.g., Texture 2) is not shared by multiple instances, parallel data processing circuit 230 maintains the Texture in the local shared memory 240 and allocates another data storage location of the local shared memory 240 for the Copy of the Texture when the allocated capacity of the local shared memory 240 is below a threshold.

Figure 3:
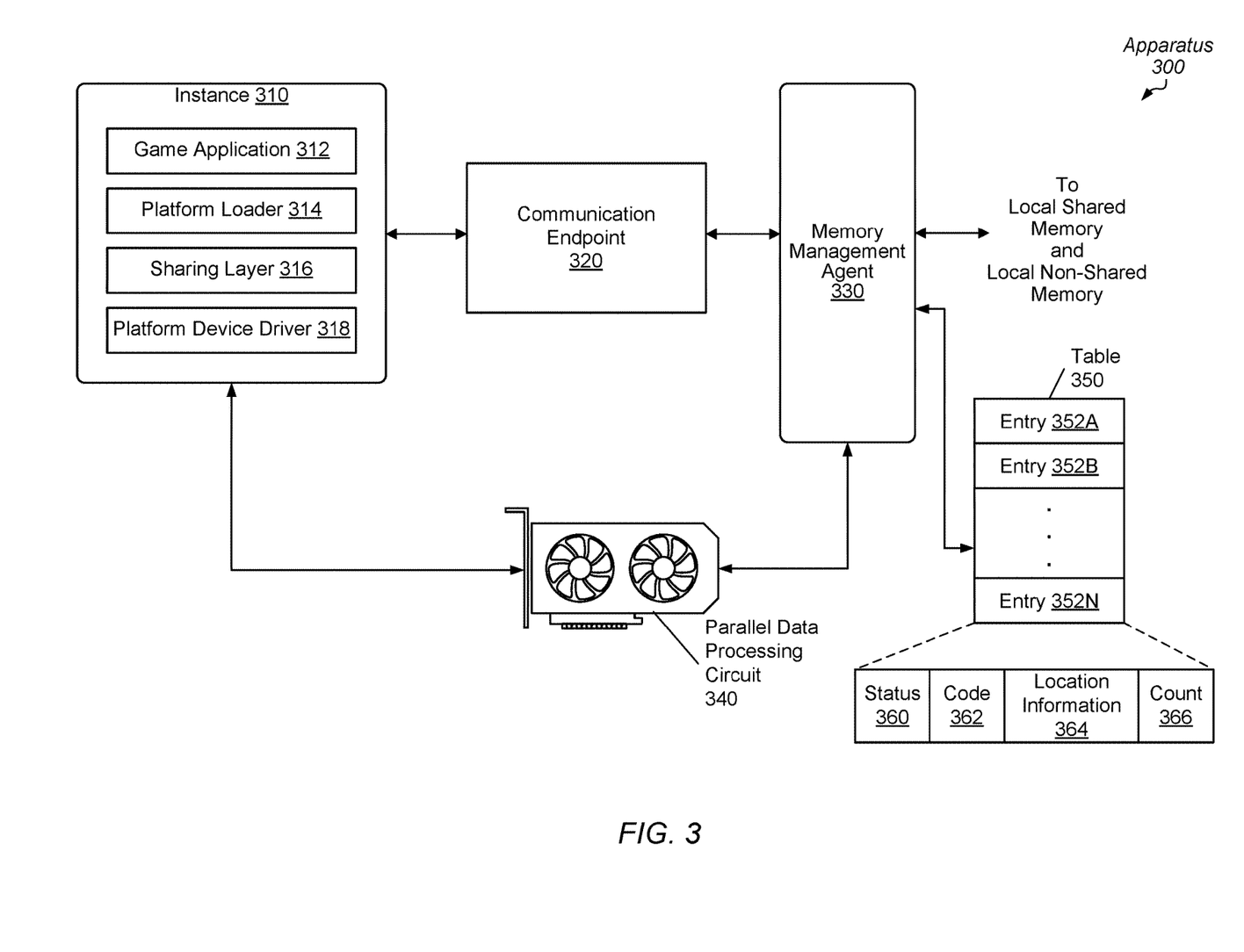
FIG. 3 is a generalized diagram of an apparatus that performs efficient sharing of network-based resources.

Referring to FIG. 3, a generalized diagram is shown of an apparatus 300 that performs efficient sharing of network-based resources. In the illustrated implementation, apparatus 300 includes instance 310, communication endpoint 320, memory management agent 330, and parallel data processing circuit 340. In various implementations, parallel data processing circuit 340 has the same functionality as processing circuit 102 (of FIG. 1) and parallel data processing circuit 230 (of FIG. 2). Although particular hardware components are shown, such as a graphics card and fans, in other implementations, parallel data processing circuit 340 is located on a SoC or located within a semiconductor die of accelerated processing unit (APU) with another processing circuit. Memory management agent 330 is a process that is executed by parallel data processing circuit 340 and includes instructions that manage requests and responses between one or more memories (e.g., local shared memory and local non-shared memory) and instance 310 running on parallel data processing circuit 340. Memory management agent maintains a data structure, such as table 350, that tracks information of at least image objects stored in the one or more memories. Communication endpoint 320 exchanges requests, commands, responses, and response data between processes executing on the same host operating system.

In the illustrated implementation, communication endpoint 320 exchanges data between instance 310 and memory management agent 330. In some implementations, communication endpoint 320 is an operating system domain socket or inter-process communication socket. Instance 310 includes instructions (or translated commands) of game application 312, which is a highly parallel data application. Instance 310 also includes platform loader 314. The platform loader 314 allows applications, such as game application 312, to select a development platform from a list of installed platforms and dispatches graphics library API function calls to the selected platform. Examples of these platforms are Vulkan, OpenGL (Open Graphics Library), OpenGL for Embedded Systems (OpenGL ES), DirectX, and so forth.

Instance 310 includes platform device driver 318. In some implementations, the platform device driver 318 translates function calls in the game application 312 to commands particular to a piece of hardware, such as the parallel data processing circuit 340, and sends the translated commands to a kernel mode driver (not shown). The selected platform can allow other platform device drivers to execute concurrently with platform device driver 318, each corresponding to a particular piece of hardware. Platform loader 314 discovers available platform device drivers on the system and enumerates the multiple pieces of hardware (physical hardware processing circuits) devices available for the game application 312. Platform loader 314 returns this information to the game application 312. In addition, platform loader 314 inserts one or more layers (layer libraries) between game application 312 and one or more device drivers such as platform device driver 318.

Layers, such as sharing layer 316, are libraries of function calls that change the platform development environment. For example, layers can intercept, evaluate, and modify existing function calls and commands during transit from game application 312 to platform device driver 318 and on the return path too. Platform loader 314 loads at least sharing layer 316 when instance 310 is created. Instance 310 also includes context information (not shown). The context information can include a unique identifier, a network address of a corresponding client device, a set of permissions for the client device, location information of image objects for the instance 310, player statistics such as a score and an indication of a game level, and so on. Each layer, such as sharing layer 316, has a list of a subset of environment function calls to intercept.

When executing instructions of sharing layer 316, parallel data processing circuit 340 intercepts copy commands executed by game application 312. Once intercepted, when executing instructions of sharing layer 316, parallel data processing circuit 340 performs steps to avoid data corruption in a local shared memory by performing a copy on write operation. To perform the copy on write operation, when executing instructions of sharing layer 316, parallel data processing circuit 340 writes (stores) the copy of the content of the copy of the image object in local non-shared memory. In an implementation, the copy command requests to modify the original image object (a car) with a copy of the image object (a dog).

When executing instructions of sharing layer 316, parallel data processing circuit 340 searches the local shared memory for the content of the original image object (car) and the content of the copy of the image object (dog). In some implementations, parallel data processing circuit 340 sends a request to a general-purpose processing circuit to generate a code based on the content of the original image object (car) and another code based on the content of the copy of the image object (dog). In an implementation, each of these codes is a hash value based on the varying data sizes of the content of a corresponding one of the original image object (car) and the copy of the image object (dog). The general-purpose processing circuit uses a hash function that follows a particular algorithm to generate the hash value as a numeric value of a fixed length that uniquely identifies data such as a particular image object. The general-purpose processing circuit returns the codes to parallel data processing circuit 340. In some implementations, this data transfer and communication between parallel data processing circuit 340 and the general-purpose processing circuit utilizes a communication channel that supports the Peripheral Component Interconnect Express (PCIe) protocol. Therefore, parallel data processing circuit 340 and the general-purpose processing circuit perform communication and data transmission in a similar manner as processing circuit 102 and processing circuit 110 (of FIG. 1).

In some implementations, when executing the instructions of memory management agent 330, parallel data processing circuit 340 searches table 350 using the returned codes. Table 350 includes table entries (or entries) 352A-352N. Table 350 is implemented with one of a variety of data storage circuits such as registers, flip flop circuits, one of a variety of types of random-access memory (RAM), a content addressable memory (CAM), and so forth. As shown, each of the entries 352A-352N includes multiple fields 360-366. Although particular information is shown as being stored in the fields 360-366 and in a particular contiguous order, in other implementations, a different order is used, and a different number and type of information is stored. As shown, field 360 stores status information such as at least a valid bit. Field 362 stores a code value, such as a hash code, of a corresponding image object stored in the local shared memory. Field 364 stores location information that points to a data storage location of the local shared memory used to store the corresponding image object. In some implementations, the location information is a file descriptor. Field 366 stores a count of the number of instances accessing (and thus, sharing) the corresponding image object. When the count is greater than one, the corresponding image object is shared by multiple instances.

When parallel data processing circuit 340 determines the content of the original image object (car) is shared by multiple instances, parallel data processing circuit 340 allocates data storage space of the local shared memory. Afterward, parallel data processing circuit 340 writes the copy of the image object (dog) from the local non-shared memory to the allocated data storage space of the local shared memory. Parallel data processing circuit 340 provides, to the instance 310 requesting the copy of the image object, location information of the allocated data storage space of the local shared memory storing the copy of the image object (dog). In addition, parallel data processing circuit 340 allocates one of the entries 352A-352N with information corresponding to the copy of the image object (dog).

Figure 4:
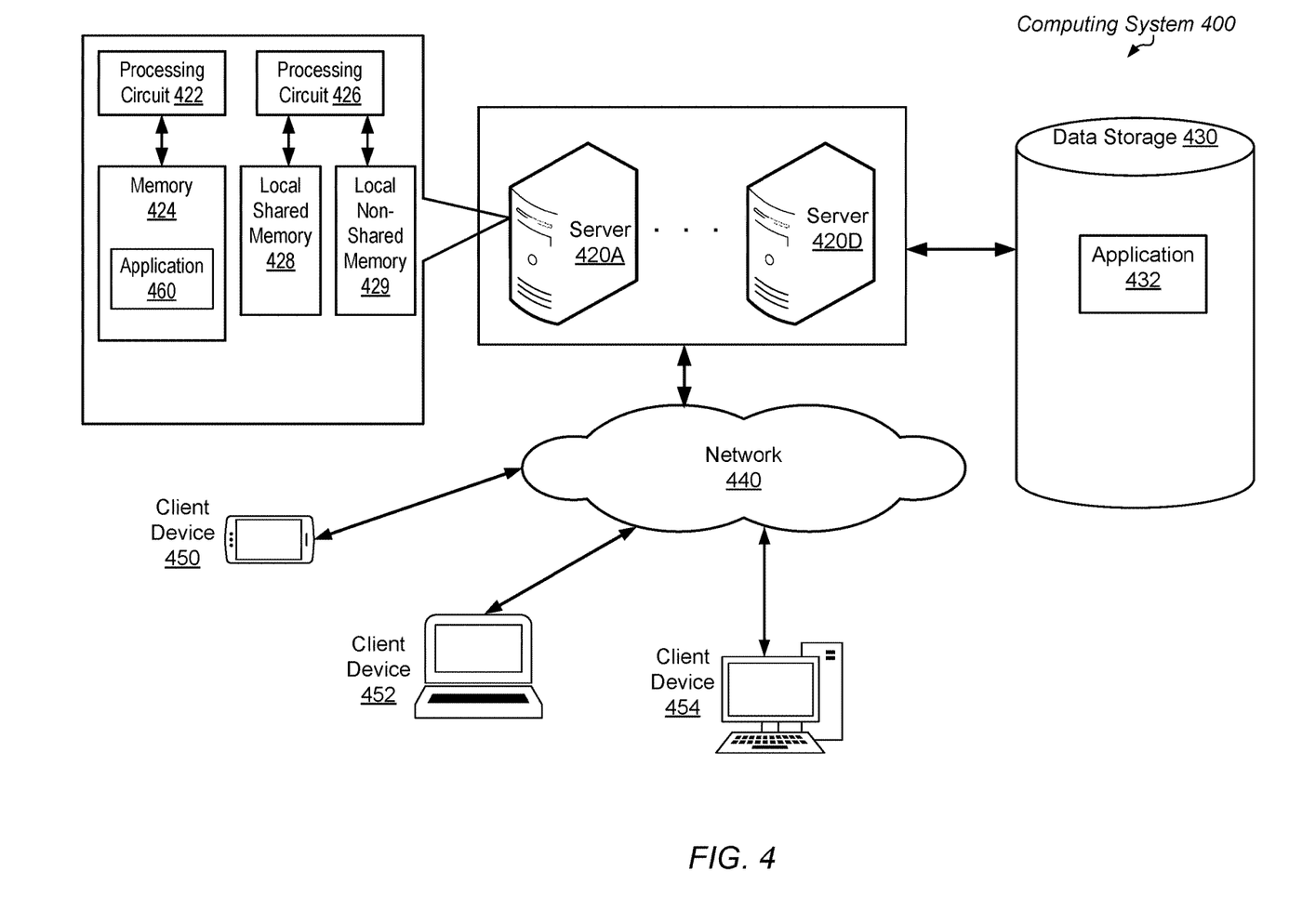
FIG. 4 is a generalized diagram of a computing system that performs efficient sharing of network-based resources.

Turning now to FIG. 4, a generalized diagram is shown of a computing system 400 that performs efficient sharing of network-based resources. In the illustrated implementation, computing system 400 includes multiple client devices 450, 452 and 454, a network 440, the servers 420A-420D, and the data storage 430 that includes a copy of an application 432. As shown, server 420A includes a processing circuit 422 that accesses memory 424 to process tasks, and the processing circuit 426 that accesses memory 428 to process tasks. Although three client devices 450, 452 and 454 are shown, any number of client devices access applications run on the servers 420A-420D. For example, server 420A stores the application 460 in memory 424, which is a copy of the application 432 stored in the data storage 430. Examples of the client devices 450, 452 and 454 are a laptop computer, a smartphone, a gaming console connected to a television, a tablet computer, a desktop computer, or other.

Clock sources, such as phase lock loops (PLLs), an interrupt controller, a communication fabric, power controllers, memory controllers, interfaces for input/output (I/O) devices, and so forth are not shown in the computing system 400 for ease of illustration. It is also noted that the number of components of the computing system 400 and the number of subcomponents for those shown in FIG. 4 can vary from implementation to implementation. There can be more or fewer of each component/subcomponent than the number shown for the computing system 400.

In various implementations, server 420A supports a corresponding one of the client devices 450-454 accessing a streaming service, such as the application 432, and remotely requests executing the streaming service. An example of the streaming service is a video game streaming service. The streaming service provides real-time updates of video content based on inputs from the user as the user accesses the streaming service on the corresponding one of the client devices 450-454. In various implementations, the client devices 450, 452 and 454 include a network interface (not shown) supporting one or more communication protocols for data and message transfers through the network 440. Network 440 includes multiple switches, routers, cables, wireless transmitters, and the Internet for transferring messages and data. Accordingly, the network interface of the client device 450 supports one or more of the Hypertext Transfer Protocol (HTTP), the Transmission Control Protocol (TCP), the User Datagram Protocol (UDP), or another protocol for communication across the World Wide Web.

In some implementations, an organizational center (not shown) maintains the application 432. In addition to communicating with the client devices 450, 452 and 454 through the network 440, the organizational center also communicates with the data storage 430 for storing and retrieving data. The data storage 430 includes one or more of a variety of hard disk drives and solid-state drives for data storage. Through user authentication, users are able to access resources through the organizational center to update user profile information, access a history of purchases or other accessed content, and download content.

In various implementations, processing circuit 422 has the same functionality described earlier for processing circuit 110 (of FIG. 1), and processing circuit 426 has the same functionality described earlier for processing circuit 102 (of FIG. 1). Additionally, processing circuit 426 accesses local shared memory 428 in a similar manner as processing circuit 102 accesses memory devices 182, and processing circuit 426 accesses local shared memory 429 in a similar manner as processing circuit 102 accesses memory devices 180 (of FIG. 1). Processing circuit 422 translates instructions of a parallel data function call of the application 460 to commands that are executable by processing circuit 426. The servers 420A-420D include a variety of server types such as database servers, computing servers, application servers, file servers, mail servers, cloud-based servers, and so on. In various implementations, the servers 420A-420D and the client devices 450, 452 and 454 operate with a client-server architectural model. In various implementations, application 432 is one of a variety of types of parallel data applications. In some implementations, the application 432 (and its copy, which is application 460) is a user-requested application that is a particular video game application accessed through the network 440 that provides content in real time to a user operating one of the client devices 450-454.

Regarding the methods 500-700 (of FIGS. 5-7), in various implementations, a computing system includes a remote server providing a streaming service to a client computing device (or client device) over a network. The network can be a cloud network that includes a wide area network (WAN) for supporting communication between multiple client devices and multiple remote servers where the remote servers provide authorized access to a variety of resources and services. The remote servers are cloud-based servers. Examples of the client device are a user's computing device such as a laptop computer, a desktop computer, a smartphone, or other. The content is presented in a virtual computing environment on the user's computing. Video game (or gaming) streaming services is an example of services providing real-time presentation of content on a user's computing device where the content is updated in real-time based on user input.

Figure 5:
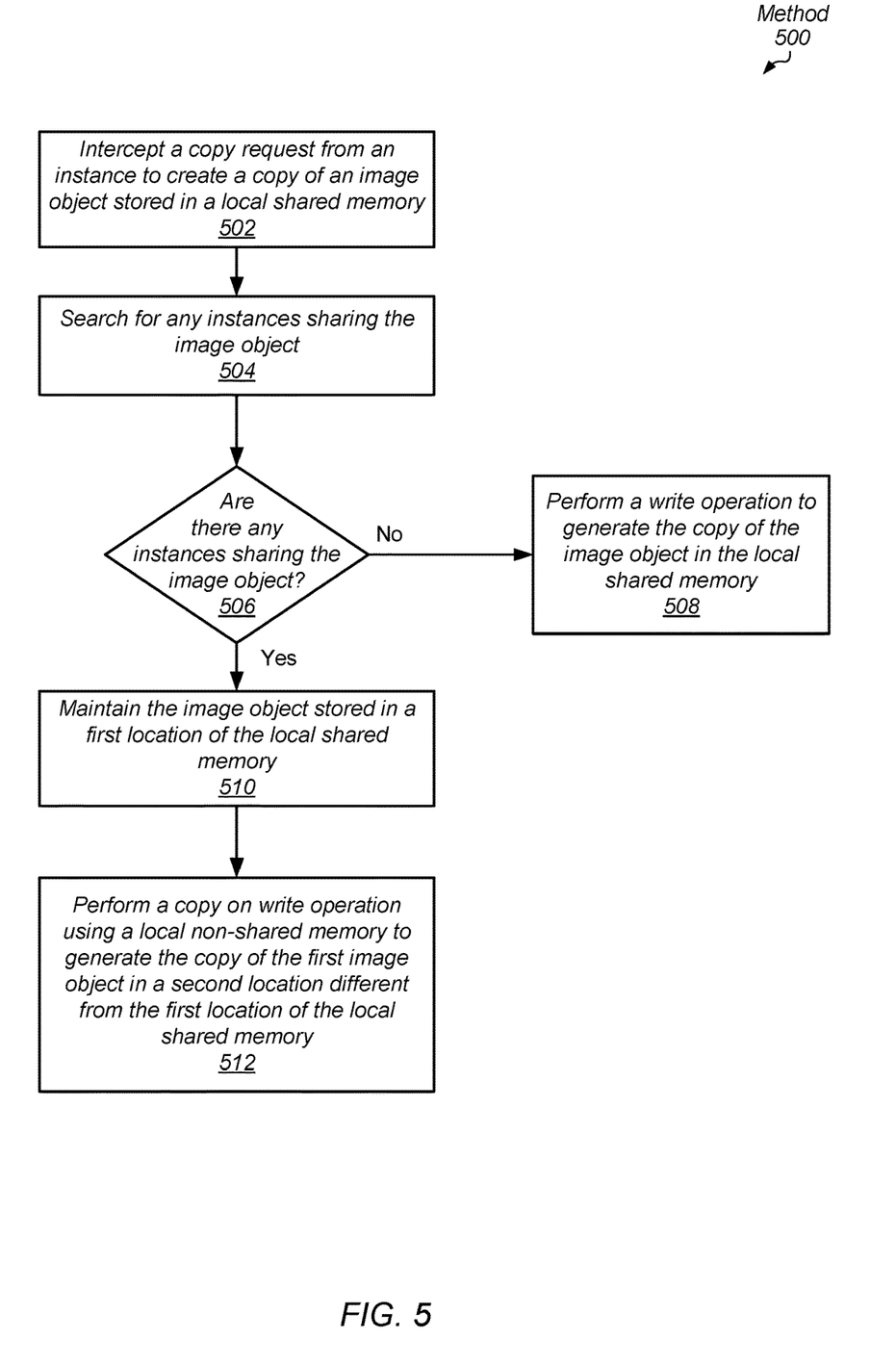
FIG. 5 is a generalized diagram of a method for performing efficient sharing of network-based resources.
Figure 6:
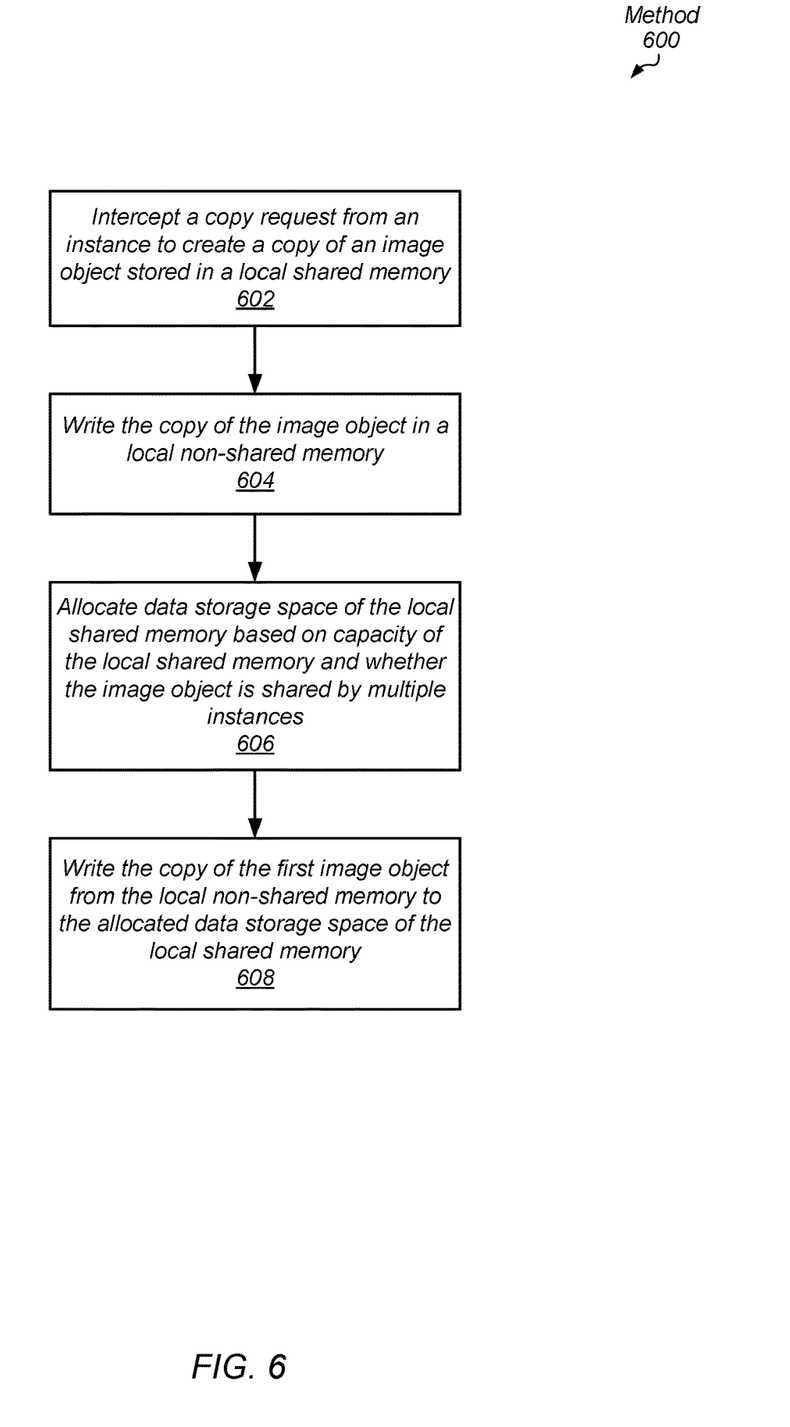
FIG. 6 is a generalized diagram of a method for performing efficient sharing of network-based resources.
Figure 7:
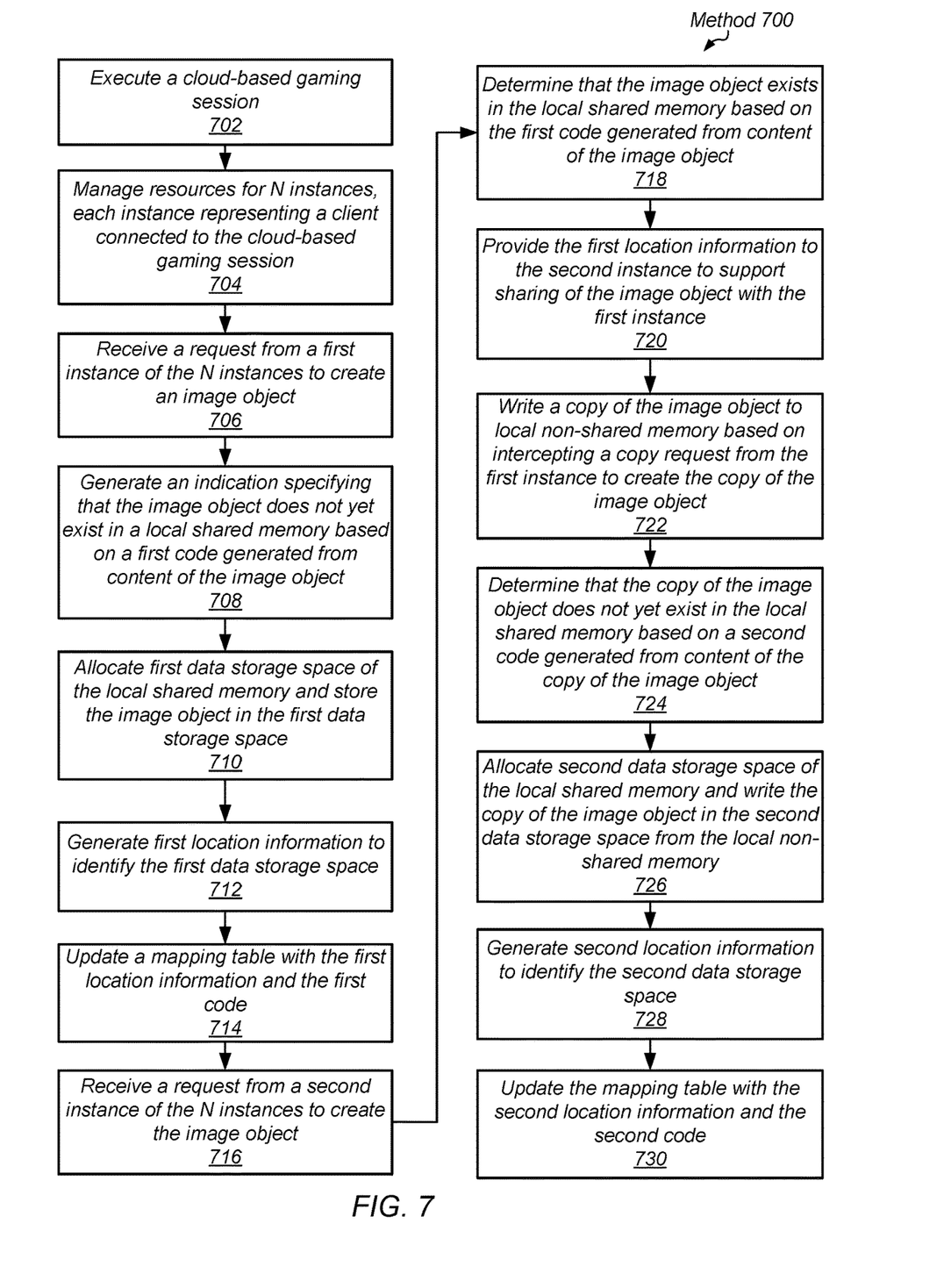
FIG. 7 is a generalized diagram of a method for performing efficient sharing of network-based resources.

The remote servers include shared resources that provide the services and content on the user's computing device. Examples of the shared resources are one or more advanced processing circuits providing the services and content, and dedicated memory for the one or more processing circuits. In some implementations, the remote server includes circuitry of an accelerated processing unit (APU) that includes multiple different integrated circuits, each providing different functionality. For example, the APU includes at least a general-purpose processing unit, such as a central processing unit (CPU), with multiple cores capable of executing instructions of a general-purpose instruction set architecture (ISA). The APU also includes a parallel data processing unit, such as a graphics processing unit (GPU), that includes the circuitry of one or more processor cores with a single instruction multiple data (SIMD) parallel architecture. The parallel data processing circuit can also include a digital signal processing circuit (DSP), a field programmable gate array (FPGA), an application specific integrated circuit (ASIC), and so forth. The general-purpose processing circuit translates instructions of parallel data function calls of an application to commands that are executable by the parallel data processing circuit.

Each user accessing a streaming service on a cloud-based server generates a process on the cloud-based server. Referring to FIG. 5, a generalized diagram is shown of a method 500 for performing efficient sharing of network-based resources. For purposes of discussion, the steps in this implementation (as well as FIGS. 6-7) are shown in sequential order. However, in other implementations some steps occur in a different order than shown, some steps are performed concurrently, some steps are combined with other steps, and some steps are absent.

When executing instructions of a shared layer of a graphics library, the circuitry of a parallel data processing circuit intercepts a copy request (or copy command) from an instance to create a copy of an image object stored in a local shared memory (block 502). When executing instructions of a shared layer, the circuitry of the parallel data processing circuit searches for any instances sharing the image object (block 504). If there are no instances sharing the image object ("no" branch of the conditional block 506), then the circuitry performs a write operation to generate the copy of the image object in the local shared memory (block 508). If there are any instances sharing the image object ("yes" branch of the conditional block 506), then the circuitry maintains the image object stored in a first location of the local shared memory (block 510). The circuitry performs a copy on write operation using a local non-shared memory to generate the copy of the first image object in a second location different from the first location of the local shared memory (block 512).

Turning now to FIG. 6, a generalized diagram is shown of a method 600 for performing efficient sharing of network-based resources. When executing instructions of a shared layer, the circuitry of the parallel data processing circuit intercepts a copy request from an instance to create a copy of an image object stored in a local shared memory (block 602). The circuitry writes the copy of the image object in a local non-shared memory (block 604). The circuitry allocates data storage space of the local shared memory based on capacity of the local shared memory and whether the image object is shared by multiple instances (block 606). The circuitry writes the copy of the first image object from the local non-shared memory to the allocated data storage space of the local shared memory (block 608).

Referring to FIG. 7, a generalized diagram is shown of a method 700 for performing efficient sharing of network-based resources. Circuitry of a parallel data processing circuit executes a cloud-based gaming session (block 702). The circuitry manages resources for N instances, each instance representing a client connected to the cloud-based gaming session (block 704). Here, N is a positive, non-zero integer. The circuitry receives a request from a first instance of the N instances to create an image object (block 706). The circuitry generates an indication specifying that the image object does not yet exist in a local shared memory based on a first code generated from content of the image object (block 708).

The circuitry allocates first data storage space of the local shared memory and stores the image object in the first data storage space (block 710). The circuitry generates first location information to identify the first data storage space (block 712). The circuitry updates a mapping table with the first location information and the first code (block 714). The circuitry receives a request from a second instance of the N instances to create the image object (block 716). The circuitry determines that the image object exists in the local shared memory based on the first code generated from content of the image object (block 718). The circuitry provides the first location information to the second instance to support sharing of the image object with the first instance (block 720).

The circuitry writes a copy of the image object to local non-shared memory based on intercepting a copy request from the first instance to create the copy of the image object (block 722). The circuitry determines that the copy of the image object does not yet exist in the local shared memory based on a second code generated from content of the copy of the image object (block 724). The circuitry allocates second data storage space of the local shared memory and writes the copy of the image object in the second data storage space from the local non-shared memory (block 726). The circuitry generates second location information to identify the second data storage space (block 728). The circuitry updates the mapping table with the second location information and the second code (block 730).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware-based type emulator from such vendors as Cadence®, EVER, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A non-transitory computer readable medium comprising program instructions executable by circuitry to:
   intercept a command from an instance of a plurality of instances to modify a first image object in a local shared memory, wherein each of the plurality of instances is an application process;
   maintain the first image object stored in a first location of the local shared memory;
   write a copy of the first image object in a local non-shared memory; and
   write the copy of the first image object in a second location of the local shared memory from the local non-shared memory, wherein the second location is different from the first location.

2. The non-transitory computer readable medium as recited in claim 1, wherein the program instructions are executable by the circuitry to maintain the first image object stored in the first location of the local shared memory responsive to a first indication specifying the first image object is shared by two or more instances of the plurality of instances.

3. The non-transitory computer readable medium as recited in claim 2, wherein the program instructions are further executable by the circuitry to search a data structure storing, for each image object stored in the local shared memory, a code generated by content of the image object and a corresponding count of instances sharing the image object.

4. The non-transitory computer readable medium as recited in claim 3, wherein the program instructions are further executable by the circuitry to replace in the local shared memory a second image object having a first hash value as its code stored with a copy of the second image object having a second hash value as its code responsive to a second indication specifying the second image object is accessed by a single instance of the plurality of instances.

5. The non-transitory computer readable medium as recited in claim 3, wherein the program instructions are further executable by the circuitry to maintain in the local shared memory a second image object having a first hash value as its code while storing in the local shared memory a copy of the second image object having a second hash value as its code responsive to:
   a second indication specifying the second image object is accessed by a single instance of the plurality of instances; and
   an allocated capacity of the local shared memory is less than a threshold.

6. The non-transitory computer readable medium as recited in claim 1, wherein the instance corresponds to a process supporting a client of a plurality of clients connected to a parallel data application executing on a remote server, wherein each of the plurality of clients is configured to modify one or more image objects stored in the local shared memory via a corresponding instance.

7. The non-transitory computer readable medium as recited in claim 6, wherein the local shared memory is a local memory dedicated to a parallel data processing circuit of the remote server executing the parallel data application.

8. A method, comprising:
   intercepting, by circuitry of a processing circuit, a command from an instance of a plurality of instances to modify a first image object in a local shared memory, wherein each of the plurality of instances is an application process;
   maintaining, by the circuitry, the first image object stored in a first location of the local shared memory;
   writing, by the circuitry, a copy of the first image object in a local non-shared memory; and
   writing, by the circuitry, the copy of the first image object in a second location of the local shared memory from the local non-shared memory, wherein the second location is different from the first location.

9. The method as recited in claim 8, wherein the maintaining of the first image object stored in the first location of the local shared memory is responsive to a first indication specifying the first image object is shared by two or more instances of the plurality of instances.

10. The method as recited in claim 9, further comprising searching, by the circuitry, a data structure storing, for each image object stored in the local shared memory, a code generated by content of the image object and a corresponding count of instances sharing the image object.

11. The method as recited in claim 10, further comprising replacing in the local shared memory, by the circuitry, a second image object having a first hash value as its code stored with a copy of the second image object having a second hash value as its code responsive to a second indication specifying the second image object is accessed by a single instance of the plurality of instances.

12. The method as recited in claim 10, further comprising maintaining in the local shared memory, by the circuitry, a second image object having a first hash value as its code while storing in the local shared memory a copy of the second image object having a second hash value as its code responsive to:
   a second indication specifying the second image object is accessed by a single instance of the plurality of instances; and
   an allocated capacity of the local shared memory is less than a threshold.

13. The method as recited in claim 8, wherein the instance corresponds to a process supporting a client of a plurality of clients connected to a parallel data application executing on a remote server, wherein each of the plurality of clients is configured to modify one or more image objects stored in the local shared memory via a corresponding instance.

14. The method as recited in claim 13, wherein the local shared memory is a local memory dedicated to a parallel data processing circuit executing the parallel data application.

15. An apparatus comprising:
   circuitry configured to:
      intercept a command from an instance of a plurality of instances to modify a first image object in a local shared memory, wherein each of the plurality of instances is an application process;
      maintain the first image object stored in a first location of the local shared memory;
      write a copy of the first image object in a local non-shared memory; and
      write the copy of the first image object in a second location of the local shared memory from the local non-shared memory, wherein the second location is different from the first location.

16. The apparatus as recited in claim 15, wherein the circuitry is configured to maintain the first image object stored in the first location of the local shared memory responsive to a first indication specifying the first image object is shared by two or more instances of the plurality of instances.

17. The apparatus as recited in claim 15, wherein the circuitry is further configured to search a data structure storing, for each image object stored in the local shared memory, a code generated by content of the image object and a corresponding count of instances sharing the image object.

18. The apparatus as recited in claim 17, wherein the circuitry is further configured to replace in the local shared memory a second image object having a first hash value as its code stored with a copy of the second image object having a second hash value as its code responsive to a second indication specifying the second image object is accessed by a single instance of the plurality of instances.

19. The apparatus as recited in claim 17, wherein the circuitry is further configured to maintain in the local shared memory a second image object having a first hash value as its code while storing in the local shared memory a copy of the second image object having a second hash value as its code responsive to:
  a second indication specifying the second image object is accessed by a single instance of the plurality of instances; and
  an allocated capacity of the local shared memory is less than a threshold.

20. The apparatus as recited in claim 15, wherein the instance corresponds to a process supporting a client of a plurality of clients connected to a parallel data application executing on a remote server, wherein each of the plurality of clients is configured to modify one or more image objects stored in the local shared memory via a corresponding instance.

* * * * *